US011433865B2

(12) United States Patent
Gerber et al.

(10) Patent No.: US 11,433,865 B2
(45) Date of Patent: Sep. 6, 2022

(54) ELECTRIC PARKING BRAKE HAVING A GEARING WITH A TORQUE LIMITING DEVICE

(71) Applicant: ZF Active Safety US Inc., Livonia, MI (US)

(72) Inventors: Kraig Gerber, Plymouth, MI (US); Aaron Wahlfors, Hartland, MI (US)

(73) Assignee: ZF Active Safety US Inc., Livonia, MI (US)

(*) Notice: Subject to any disclaimer, the term of this patent is extended or adjusted under 35 U.S.C. 154(b) by 391 days.

(21) Appl. No.: 16/458,564

(22) Filed: Jul. 1, 2019

(65) Prior Publication Data

US 2021/0001826 A1   Jan. 7, 2021

(51) Int. Cl.
| *F16D 65/18* | (2006.01) |
| *B60T 13/58* | (2006.01) |
| *B60T 1/06* | (2006.01) |
| *B60T 13/74* | (2006.01) |
| *F16H 25/20* | (2006.01) |
| *F16D 7/00* | (2006.01) |
| *F16H 35/10* | (2006.01) |

(52) U.S. Cl.
CPC ............ *B60T 13/588* (2013.01); *B60T 1/065* (2013.01); *B60T 13/746* (2013.01); *F16D 7/005* (2013.01); *F16H 25/2021* (2013.01); *F16H 35/10* (2013.01); *F16H 2025/2053* (2013.01); *F16H 2025/2071* (2013.01)

(58) Field of Classification Search
CPC .... F16D 65/183; F16D 2125/40; F16D 7/005; F16D 7/08; B60T 13/741; B60T 13/746
See application file for complete search history.

(56) References Cited

U.S. PATENT DOCUMENTS

| 1,386,272 | A | * | 8/1921 | Morse | F16D 41/061 |
| | | | | | 464/36 |
| 3,252,303 | A | * | 5/1966 | Weasler | F16D 7/08 |
| | | | | | 464/36 |
| 3,754,412 | A | * | 8/1973 | Briggs | F16D 7/08 |
| | | | | | 192/17 C |
| 8,382,594 | B2 | * | 2/2013 | Aunspach | F16D 43/206 |
| | | | | | 464/36 |
| 8,844,683 | B2 | | 9/2014 | Sternal et al. | |
| 9,587,692 | B2 | * | 3/2017 | Gutelius | F16D 55/226 |
| 2005/0039991 | A1 | * | 2/2005 | Severinsson | B60T 13/741 |
| | | | | | 188/72.1 |
| 2014/0135132 | A1 | * | 5/2014 | Kohuth | F16D 7/08 |
| | | | | | 464/36 |

(Continued)

*Primary Examiner* — Bradley T King
(74) *Attorney, Agent, or Firm* — Robert James Harwood

(57) ABSTRACT

An electrically actuated parking brake has a single electric motor producing a torque, a first torque limiting device with a first spring force, and a second torque limiting device with a second spring force. The first torque limiting device fully transmits a first portion of the torque to a first spindle until a first clamp force overcomes the first spring force and the second torque limiting device fully transmits a second portion of the torque to a second spindle until a second clamp force overcomes the second spring force. When the first clamp force overcomes the first spring force and the second spring force overcomes the second clamp force, the first portion of the torque that exceeds the first spring force is transmitted to the second spindle by the second torque limiting device.

13 Claims, 10 Drawing Sheets

(56) References Cited

U.S. PATENT DOCUMENTS

| | | | |
|---|---|---|---|
| 2017/0058979 A1* | 3/2017 | Bahmata | F16D 55/226 |
| 2017/0261053 A1 | 9/2017 | Schaefer et al. | |
| 2017/0370433 A1* | 12/2017 | Chelaidite | F16D 55/225 |
| 2018/0087589 A1 | 3/2018 | Gerber et al. | |
| 2018/0087590 A1* | 3/2018 | Chelaidite | F16D 65/183 |
| 2020/0096067 A1* | 3/2020 | Boyle | F16D 65/0971 |
| 2020/0309214 A1* | 10/2020 | Al-Mahshi | F16D 65/183 |

* cited by examiner

ELECTRIC PARKING BRAKE HAVING A GEARING WITH A TORQUE LIMITING DEVICE

BACKGROUND OF INVENTION

The invention relates in general to electric parking brakes for use with disc brake assemblies and in particular to an improved gearing for such an electric parking brake.

A typical disc brake assembly for a vehicle includes a brake disc which is secured to a wheel of the vehicle for rotation therewith and non-rotating brake linings that are operable between non-braking and braking positions. Each of the brake linings is supported on a brake shoe. In the non-braking position, the brake linings do not slow rotation of the brake disc and vehicle wheel. In the braking position, the brake linings are in frictional engagement with the brake disc to slow rotation of the brake disc and vehicle wheel.

The disc brake assembly further includes a brake piston and a sliding brake caliper. The brake linings are moved into the braking position by the brake piston and the sliding brake caliper. For example, hydraulic pressure may linearly actuate the brake piston to displace the brake linings to frictionally engage the brake disc. This provides service braking. Typically, the brake piston displaces an inboard brake lining directly and an outboard brake lining via the brake caliper.

The disc brake assembly may also be used to provide a parking brake function. The disc brake assembly provides the parking brake function by first using the pressure to move the brake linings into the braking position and then using an electric parking brake (EPB) to clamp or otherwise support the brake piston in the braking position. An actuator of the EPB may have a rotationally restrained spindle nut threaded onto a spindle driven by an electric motor. As the spindle is rotationally driven, the spindle nut axially translates to clamp the brake piston on the brake linings in the braking position.

Generally, as more brake pistons are provided for the single disc brake assembly, a brake force produced by the disc brake assembly increases. To produce a required brake force for some vehicles, such as pickup trucks, twin—i.e., two—brake pistons are commonly provided for each of the disc brake assemblies. When the disc brake assembly with twin brake pistons provides the parking brake function, the EPB clamps both of the twin brake pistons. To clamp both of the twin brake pistons, a separate motor is typically provided for each of the twin brake pistons. However, control of the two separate motors must be coordinated for smooth application of the EPB. Coordinating control of the two separate motors adds complexity to the EPB. Thus, it would be desirable to have a disc brake assembly with twin brake pistons and an EPB having a single motor.

SUMMARY OF INVENTION

This invention relates to electric parking brakes for use with disc brake assemblies, wherein the electric parking brake has an improved gearing.

According to one embodiment, a vehicle disc brake assembly having a hydraulically actuated service brake and an electrically actuated parking brake may comprise, individually and/or in combination, one or more of the following features: A brake disc, a first brake piston having a first inner portion and a first spindle nut rotationally restrained on a first spindle and having a first outer portion. The first outer portion is configured to clamp against the first inner portion to produce a first clamp force when the first spindle is rotated and the first clamp force engages the first brake piston against the brake disc. A second brake piston having a second inner portion and a second spindle nut rotationally restrained on a second spindle and having a second outer portion. The second outer portion is configured to clamp against the second inner portion to produce a second clamp force when the second spindle is rotated and the second clamp force engages the second brake piston against the brake disc. An electric motor configured to produce a torque to actuate and apply the parking brake. A first torque limiting device configured to, during an application of the parking brake, fully transmit a first portion of the torque to the first spindle when a first threshold value exceeds the first clamp force and not fully transmit the first portion of the torque to the first spindle when the first clamp force exceeds the first threshold value. A second torque limiting device configured to, during the application of the parking brake, fully transmit a second portion of the torque to the second spindle when a second threshold value exceeds the second clamp force and not fully transmit the second portion of the torque to the second spindle when the second clamp force exceeds the second threshold value.

According to this embodiment, the first and second threshold values may be equal.

According to this embodiment, when the first clamp force exceeds the first threshold value and the second threshold value exceeds the second clamp force, the second torque limiting device may transmit the first portion of the torque that exceeds the first threshold to the second spindle.

According to this embodiment, the electric motor may be a single electric motor.

According to this embodiment, a first total quantity of torque limiting devices may be equal to a second total quantity of brake pistons.

According to this embodiment, during a release of the parking brake, the first torque limiting device may fully transmit the first portion of the torque to the first spindle and the second torque limiting device may fully transmit the second portion of the torque to the second spindle.

According to this embodiment, each of the first and second torque limiting devices may have a first gear, a drive plate, pockets in an end face of at least one of the first gear and the drive plate, force transmitting members, and a spring member producing a spring force on the drive plate. During the application of the parking brake, the spring force holds the force transmitting members compressed in the pockets to transmit a force between the first gear and the drive plate when the spring force exceeds a portion of a clamp force and does not hold the force transmitting members in the pockets, and the force is not transmitted between the first gear and the drive plate, when the portion of the clamp force exceeds the spring force. For the first torque limiting device, the first gear may be configured to receive the first portion of the torque, the drive plate may be configured to transmit the first portion of the torque to the first spindle, and the spring force may hold the force transmitting members compressed in the pockets when the spring force exceeds the portion of the first clamp force. For the second torque limiting device, the first gear may be configured to receive the second portion of the torque, the drive plate may be configured to transmit the second portion of the torque to the second spindle, and the spring force may hold the force transmitting members compressed in the pockets when the spring force exceeds the portion of the second clamp force. The first threshold value may be equal to the spring force of the first torque limiting device and the second threshold value may be equal to the spring force of the second torque limiting device. The force transmitted by the first torque limiting device may be the first portion of the torque and the force transmitted by the second torque limiting device may be the second portion of the torque.

According to another embodiment, an electrically actuated parking brake for a vehicle disc brake assembly having first and second pistons and a brake disc may comprise, individually and/or in combination, one or more of the following features: A single electric motor configured to produce a torque and first and second torque limiting devices. The torque actuates and applies the parking brake. The first torque limiting device is configured to, during an application of the parking brake, fully transmit a first portion of the torque to a first spindle until a first clamp force produced by the parking brake overcomes a first spring force of the first torque limiting device. The first clamp force is configured to engage the first brake piston against the brake disc. The second torque limiting device is configured to, during the application of the parking brake, fully transmit a second portion of the torque to a second spindle until a second clamp force produced by the parking brake overcomes a second spring force of the second torque limiting device. The second clamp force is configured to engage the second brake piston against the brake disc. When the first clamp force overcomes the first spring force and the second spring force overcomes the second clamp force, the first torque limiting device does not fully transmit the first portion of the torque to the first spindle and the first portion of the torque that exceeds the first spring force is instead transmitted to the second spindle by the second torque limiting device.

According to this embodiment, during a release of the parking brake, the first torque limiting device may fully transmit the first portion of the torque to the first spindle and the second torque limiting device may fully transmit the second portion of the torque to the second spindle.

According to yet another embodiment, a torque limiting device for an electrically actuated parking brake producing a clamp force to engage a brake piston of a vehicle disc brake assembly against a brake disc of the vehicle disc brake assembly may comprise, individually and/or in combination, one or more of the following features: A first gear configured to receive a torque from an electric motor, a drive plate configured to transmit the torque to a spindle of the parking brake, pockets in an end face of at least one of the first gear and the drive plate, force transmitting members configured to, when held compressed between the first gear and the drive plate in the pockets, transmit the torque between the first gear and the drive plate and, when not in the pockets, to not transmit the torque between the first gear and the drive plate, and a spring member producing a spring force on the drive plate. The torque is configured to actuate and apply the parking brake. During an application of the parking brake, the spring force holds the force transmitting members compressed in the pockets when the spring force overcomes a clamp force produced by the parking brake and does not hold the force transmitting members in the pockets when the clamp force overcomes the spring force. The force transmitting members exit the pockets when not held in the pockets by the spring force during the application of the parking brake.

According to this embodiment, the first gear may be a sun gear.

According to this embodiment, the torque limiting device may further include a second gear rotationally fixed to the drive plate, wherein the drive plate transmits the torque to the spindle through the second gear. The second gear may be a pinion gear.

According to this embodiment, the pockets may be in the first gear, the drive plate, or both the first gear and the drive plate.

According to this embodiment, the pockets may further include ramp surfaces that are transverse to a longitudinal axis about which the first gear and drive plate are configured to rotate, stop surfaces parallel to the longitudinal axis, and pocket surfaces connecting the ramp surfaces and the stop surfaces. The force transmitting members may move on the ramp surfaces to exit the pockets when the clamp force overcomes the spring force.

According to this embodiment, when the clamp force overcomes the spring force, the force transmitting members may exit the pockets when the first gear is rotated in a first direction and do not exit the pockets when the first gear is rotated in a second direction opposite the first direction.

According to this embodiment, the force transmitting members may be ball bearings.

An advantage of an embodiment is an electric parking brake having a single electric motor for a disc brake assembly with twin brake pistons. Other advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
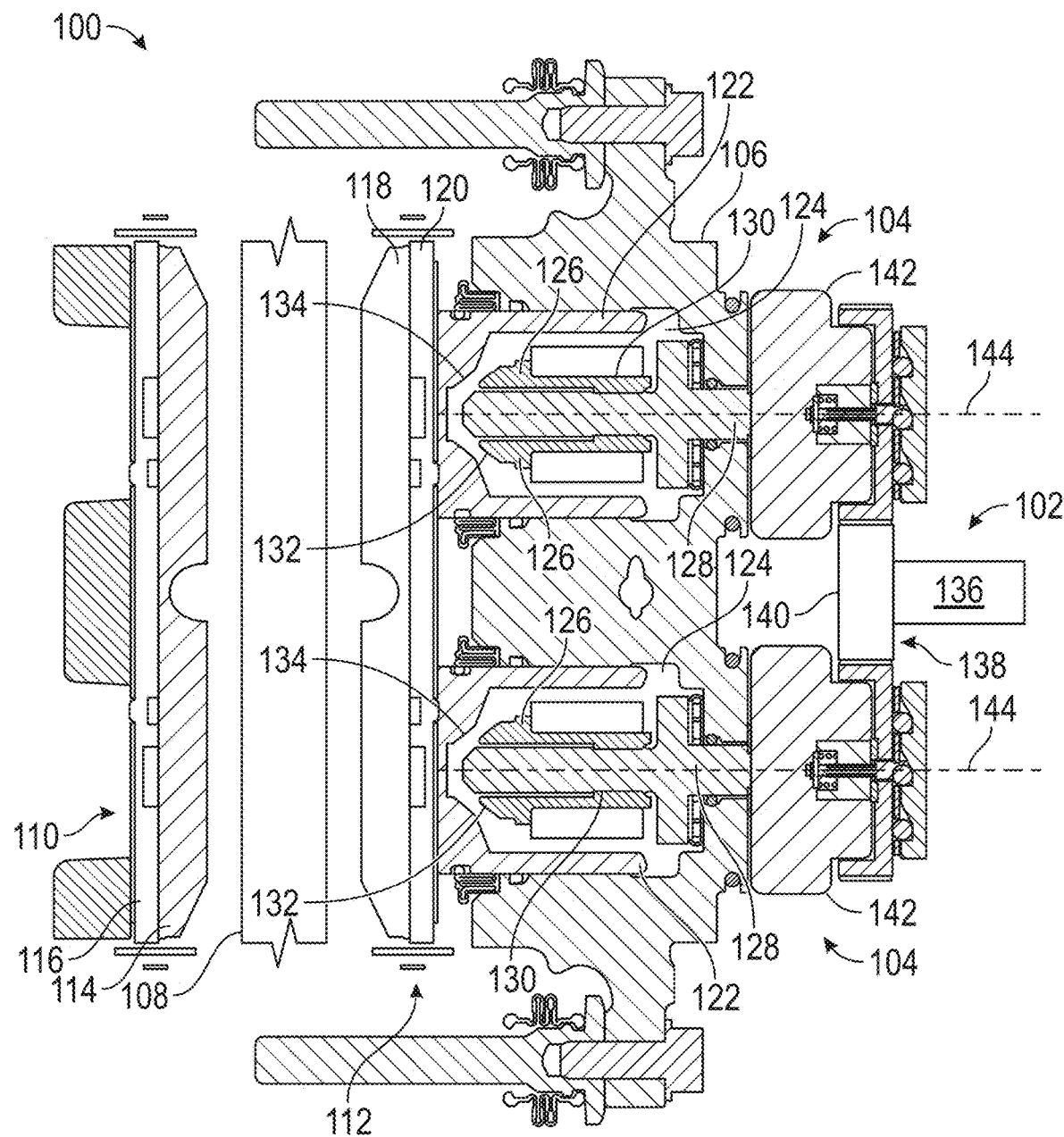
FIG. 1 is a section view of a disc brake assembly with an electric parking brake having a gearing with a first embodiment of a torque limiting device in accordance with the present invention.

Referring now to FIG. 1, there is illustrated a vehicle brake assembly comprising a vehicle disc brake assembly, indicated generally at 100, and an electric or electrically actuated parking brake (EPB), indicated generally at 102, wherein the EPB 102 has a plurality of torque limiting devices 104, indicated generally at 104. The general structure and operation of the disc brake assembly 100 and the EPB 102 are well known in the prior art. For example, the EPB 102 may operate as disclosed by U.S. Pat. No. 8,844,683 to Sternal et al., U.S. Patent Application Publication No. 2017/0261053 to Schaefer et al., or U.S. Patent Publication No. 2018/0087589 to Gerber et al., the disclosures of all of which are hereby incorporated by reference in entirety herein. The torque limiting devices 104 are not limited to use with the specific disc brake assembly 100 and EPB 102 structurally and operationally described herein.

The disc brake assembly 100 includes a sliding brake caliper 106. The brake caliper 106 is mounted in a floating manner known to those skilled in the art by means of a brake carrier (not shown). Furthermore, the brake caliper 106 spans a brake disc 108. The brake disc 108 is coupled in a rotationally fixed manner to a vehicle wheel (not shown).

The disc brake assembly 100 also includes outboard and inboard brake shoes, indicated generally at 110 and 112, respectively. The outboard brake shoe 110 has an outboard brake lining 114 supported on an outboard backing plate 116. The brake caliper 106 bears on the outboard backing plate 116. Similarly, the inboard brake shoe 112 has an inboard brake lining 118 supported on an inboard backing plate 120.

The outboard and inboard brake linings 114 and 118, respectively, face towards each other. In a release position (shown in FIG. 1), the outboard and inboard brake linings 114 and 118, respectively, are disposed with a small air clearance on both sides of the brake disc 108. As a result, no significant residual drag moments occur from the outboard and inboard brake linings 114 and 118, respectively, on the brake disc 108.

The disc brake assembly 100 further includes brake pistons 122. As illustrated, the disc brake assembly 100 has two of the brake pistons 122. Alternatively, the disc brake assembly 100 may have more than the two brake pistons 122 illustrated. Preferably, one of the torque limiting devices 104 is provided for each of the brake pistons 122—i.e., a total quantity of the torque limiting devices is equal to a total quantity of the brake pistons 122. Alternatively, one of the torque limiting devices 104 may be provided for less than each of the brake pistons 122. As a non-limiting example, when the disc brake assembly 100 has three brake pistons 122, the torque limiting devices 104 may be provided for leading and trailing brake pistons 122 but not provided for the third or middle brake piston 122 positioned between the leading and trailing brake pistons 122.

The brake pistons 122 are mounted in a movable manner in cavities 124 in the brake caliper 106. Furthermore, the brake pistons 122 are realized so as to be hollow. The brake pistons 122 bear on the inboard backing plate 120. The inboard backing plate 120 is disposed between the inboard brake lining 118 and the brake pistons 122 such that the inboard brake lining 118 and the brake pistons 122 move jointly.

In each of the hollow brake pistons 122 are rotationally restrained spindle nuts, indicated generally at 126, of the EPB 102. Also in the cavities are spindles 128. Each of the spindle nuts 126 is threaded on one of the spindles 128 for each of the brake pistons 122. Specifically, a threaded receiver portion 130 of each of the spindle nuts 126 is threaded on the spindles 128.

The spindle nuts 126 each have a conical outer portion 132 which can be brought into bearing contact with a complementary conical inner portion 134 of each of the brake pistons 122. In the release position (shown in FIG. 1), there are clearances between each of the conical outer portions 132 and the corresponding conical inner portions 134. The construction, shape, configuration, and/or make-up of the conical outer portions 132 and the complementary conical inner portion 134 may be other than as illustrated and described, if so desired. For example, the conical outer portion 132 and the conical inner portion 134 may have other, non-conical, complimentary shapes. For example, the clearances between each of the conical outer portions 132 and the corresponding conical inner portions 134 may be omitted and rotation of the spindles 128 used to position the pistons 122 away from the inboard backing plate 120.

The disc brake assembly 100 is illustrated with the EPB 102. The EPB 102 includes an electric motor 136 and a gearing, indicated generally at 138. As illustrated, the EPB 102 has a single electric motor 136 supplying a torque to multiple torque limiting devices 104. Alternatively, the EPB 102 may have more than one electric motor 136 wherein at least one of the electric motors 136 supplies its torque to more than one of the torque limiting devices 104.

As illustrated, the gearing 138 comprises a single first gearing 140 and multiple second gearings 142. As will be discussed, the first gearing 140 is operatively connected between the motor 136 and each of the torque limiting devices 104. As will also be discussed, each of the second gearings 142 is operatively connected between one of the torque limiting devices 104 and its corresponding spindle 128. Each of the second gearings 142 may be the same or some portion of the second gearings 142 may each be different.

The first and second gearings 140 and 142, respectively, are schematically illustrated. This is because any suitable gear arrangement known to those skilled in the art may be used for the first and second gearings 140 and 142, respectively. Furthermore, one or both of the first or second gearings 140 and/or 142 may be omitted from the gearing 138. When one or both of the first or second gearings 140 and/or 142 are omitted, an output shaft of the motor 136 directly drives the torque limiting devices 104 and/or the torque limiting devices 104 directly drive the spindles 128.

In operation, the motor 136 supplies the torque that rotationally drives the first gearing 140. The first gearing 140 then rotationally drives each of the torque limiting devices 104 which then drive its corresponding spindle 128 through the corresponding second gearing 142. This results in independent movement of the spindle nuts 126 along longitudinal axes 144 because, as discussed, the spindle nuts 126 are rotationally restrained. The outboard and inboard brake shoes 110 and 112, respectively, as well as the brake pistons 122, are also displaceable along the longitudinal axes 144.

When service braking is desired for a vehicle having the disc brake assembly 100, the disc brake assembly 100 is hydraulically actuated. For example, the disc brake assembly 100 may be hydraulically actuated by a driver via a brake pedal or via a drive assistance system. When the disc brake assembly 100 is hydraulically actuated, hydraulic fluid is pressurized (by a suitable means known to those skilled in the art) in the cavities 124 such that the brake pistons 122 are displaced leftward in FIG. 1 along the longitudinal axes 144. As a consequence, and as is known to those skilled in the art, the inboard brake lining 118 is pressed onto the brake disc 108 by the brake pistons 122 and, at the same time, a corresponding displacement of the brake caliper 106 on an opposite side of the brake disc 108 causes the outboard brake lining 114 to be drawn against the opposite side of the brake disc 108. As a result of the application of the pressurized hydraulic fluid to the cavities 124, the brake pistons 122 are displaced leftward in FIG. 1, along the longitudinal axis 144 towards the brake disc 108 and into a braking position. In the braking position, the brake pistons 122 engage the brake disc 108 via the inboard brake shoe 112. The spindle nuts 126 remain unactuated, and therefore remain at an initial axial position on the longitudinal axes 144 in FIG. 1.

As non-limiting examples, the parking brake function of the disc brake assembly 100 may be applied when a vehicle having the disc brake assembly 100 is running—e.g., during key on—and a brake pedal of the vehicle is applied, when the vehicle is running and the brake pedal is released, or when the vehicle is not running—e.g., during key off. For applying a parking brake function of the disc brake assembly 100, in a manner similar to service braking, the brake pistons 122 may be first put into the braking position through application of hydraulic pressure. Alternatively, the parking brake function may be applied without first putting the brake pistons 122 into the braking position through application of hydraulic pressure. Application of the EPB 102 then causes the gearing 138 (via the first gearing 140, torque limiting devices 104, and second gearings 142) to displace the spindle nuts 126 towards the brake disc 108 until the clearances have been used up and each of the conical outer portions 132 bear or otherwise clamp on their corresponding conical inner portions 134 inside the brake pistons 122. As a result, the brake pistons 122 are axially supported, via the spindle nuts 126, on the housing of the brake caliper 106 in a parking brake state.

Once the brake pistons 122 are axially supported, any hydraulic pressure in the cavities 124 can be released or otherwise removed. The parking brake state is maintained because of the position of the spindle nuts 126 and because of self-arresting (for example, by self-arresting between the spindles 128 and the threaded receivers 130). The outboard and inboard brake linings 114 and 118, respectively, pressing against the brake disc 108 remain clamped via the spindle nuts 126.

When the parking brake state is to be released, pressurized hydraulic fluid may be introduced into the cavities 124. As a result, the brake pistons 122 are displaced slightly leftward, along the longitudinal axis 144, towards the brake disc 108 such that the spindle nuts 126 are relieved of axial load. Alternatively, the parking brake state may be released without first introducing pressurized hydraulic fluid into the cavities 124. Through control of the EPB 102, the spindle nuts 126 can then be displaced back into the initial axial position illustrated in FIG. 1.

The motor 136, as well as the first gearing 140, torque limiting devices 104, and second gearings 142, may be selectively driven in opposing directions—e.g., clockwise and counterclockwise—to apply or release the parking brake function.

Referring now to FIGS. 2-8, one of the torque limiting devices 104 is illustrated in detail. The torque limiting device 104 in FIGS. 2-8, along with its associated other components, is representative of all the torque limiting devices 104 of the EPB 102. The torque limiting device 104 includes a sun gear 146, force transmitting members 148, a drive plate 150, a pinion gear 152, and a spring member 154. The sun gear 146 is rotationally driven by the first gearing 140 and the pinion gear 152 rotationally drives the second gearing 142.

Figure 4:
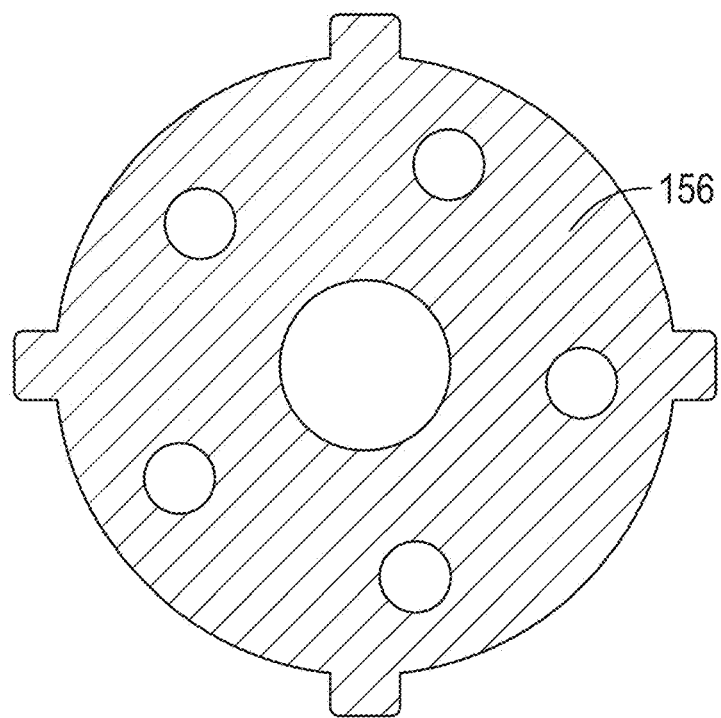
FIG. 4 is a schematic section view taken along line 4-4 of FIG. 2.

The force transmitting members 148 are held in position or otherwise spaced relative to each other by a cage 156 (shown in FIG. 4). The cage 156 holds the force transmitting members 148 in position in a plane that is generally perpendicular to the longitudinal axis 144. As illustrated, the force transmitting members 148 are spherical in shape. As a non-limiting example, the force transmitting members 148 may be ball bearings. As a further non-limiting example, the force transmitting members 148 may be fabricated from metallic or plastic material.

Figure 5:
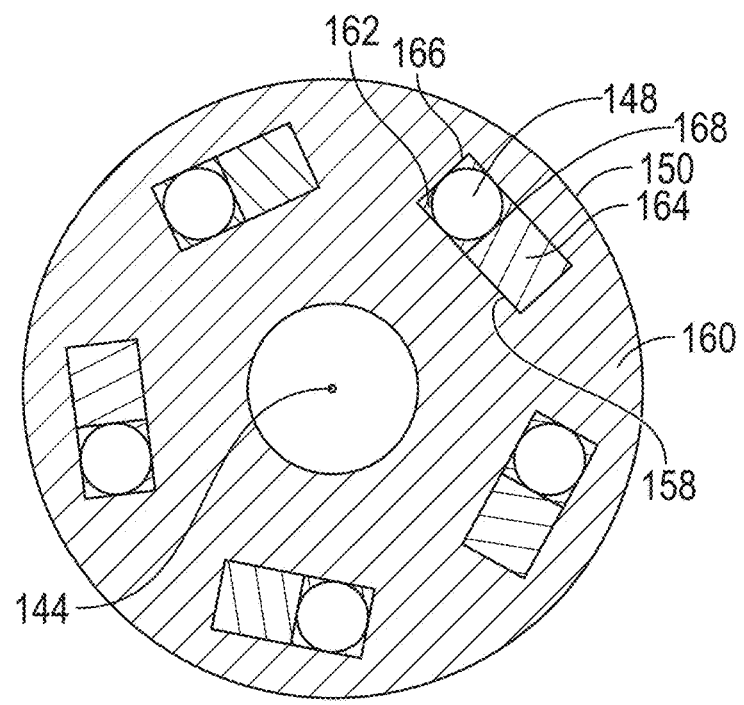
FIG. 5 is a schematic section view taken along line 5-5 of FIG. 2.
Figure 6:
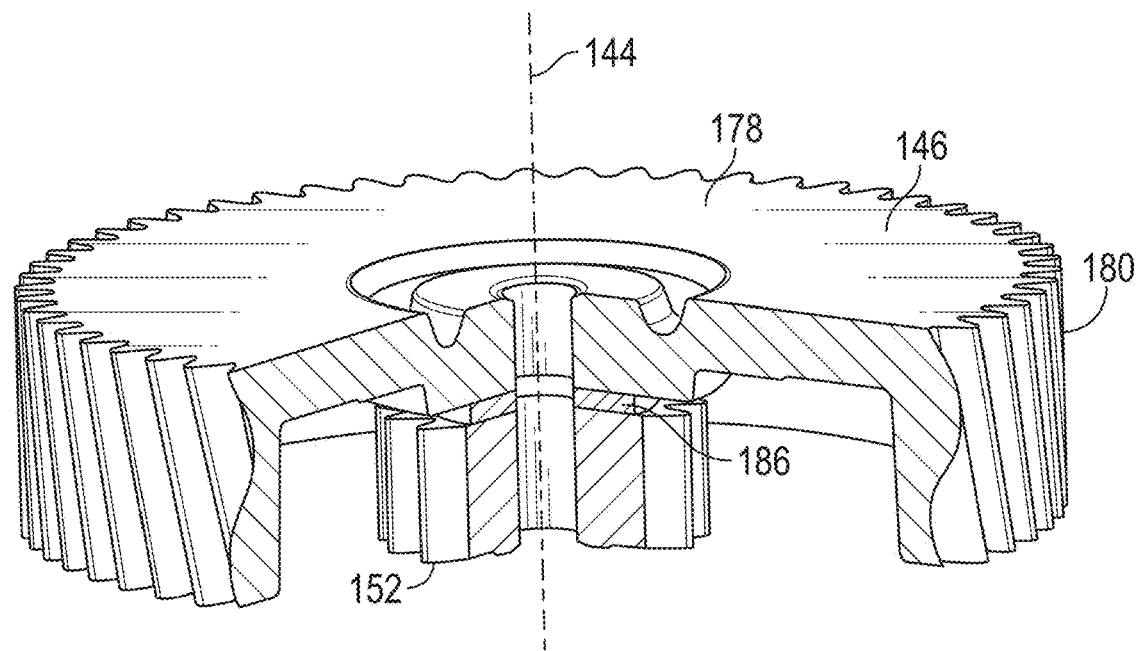
FIG. 6 is a cutaway elevation view of a portion of the torque limiting device of FIG. 1.

There are one or more pockets 158 defined within the drive plate 150. A quantity of the pockets 158 is preferably equal to or greater than a quantity of the force transmitting members 148. The pockets 158 are defined inwardly into the drive plate 150 from a drive plate end face 160. As shown in FIG. 5, the pockets 158 are circumferentially spaced about the drive plate 150. Preferably, the pockets 158 are all equal radial distances from the longitudinal axis 144.

Figure 3:
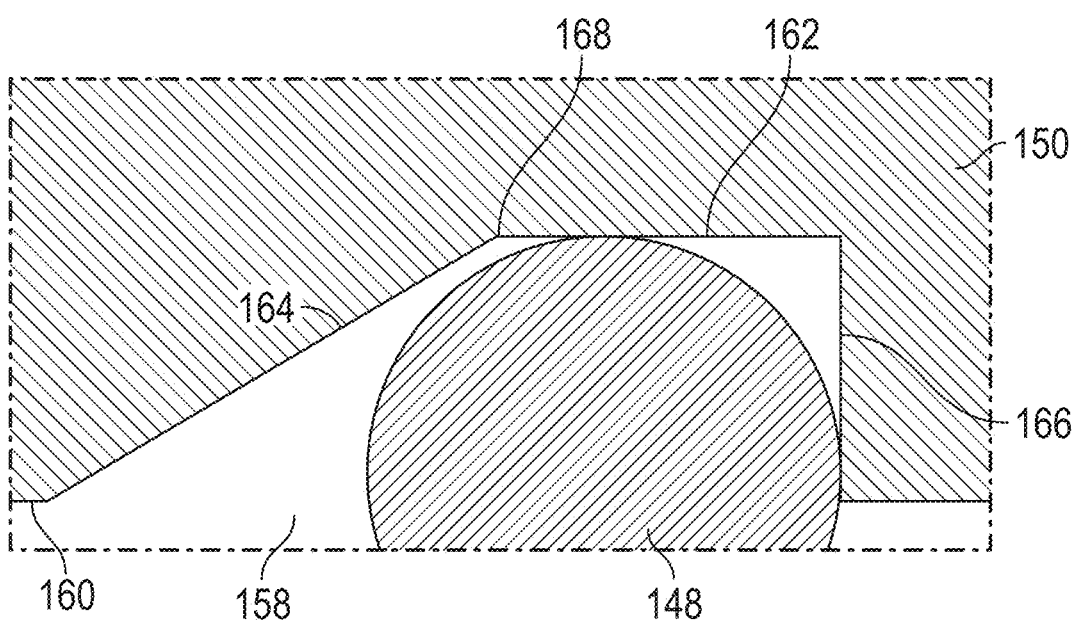
FIG. 3 is an enlarged portion of FIG. 2.

As best shown in FIG. 3, each of the pockets 158 has a pocket surface 162. Extending from the pocket surface 162 to the drive plate end face 160 are a ramp surface 164 and a stop surface 166. Between the pocket surface 162 and the ramp surface 164 is a transition point 168. The pockets 158 are preferably sized such that one of the force transmitting members 148 may enter one of the pockets 158 and contact the pocket surface 162. Alternatively, the pocket surface 162 may be omitted and the force transmitting members 148 may be cradled or otherwise held between the ramp surface 164 and stop surface 166.

The pocket surfaces 162 are preferably parallel to the drive plate end face 160. The ramp surface 164 is transverse to the longitudinal axis 144. As illustrated, the ramp surface 164 is planar. Alternatively, the ramp surface 164 may be other than planar. The stop surfaces 166 are generally perpendicular to the drive plate end face 160. Each of the pockets 158 may be similarly defined. Alternatively, a subset of the pockets 158 may be defined other than as illustrated in FIG. 3.

The spring member 154 is disposed between the pinion gear 152 and a retention member 170. The retention member 170 is secured to a shaft 172 of the drive plate 150 by a clip 174. The shaft 172 extends along the longitudinal axis 144. Alternatively, the spring member 154 may be disposed between the drive plate 150 and the pinion gear 152 other than as illustrated. As illustrated, the spring member 154 is a coil type spring. Alternatively, the spring member 154 may be of a type other than the coil spring illustrated.

Figure 2:
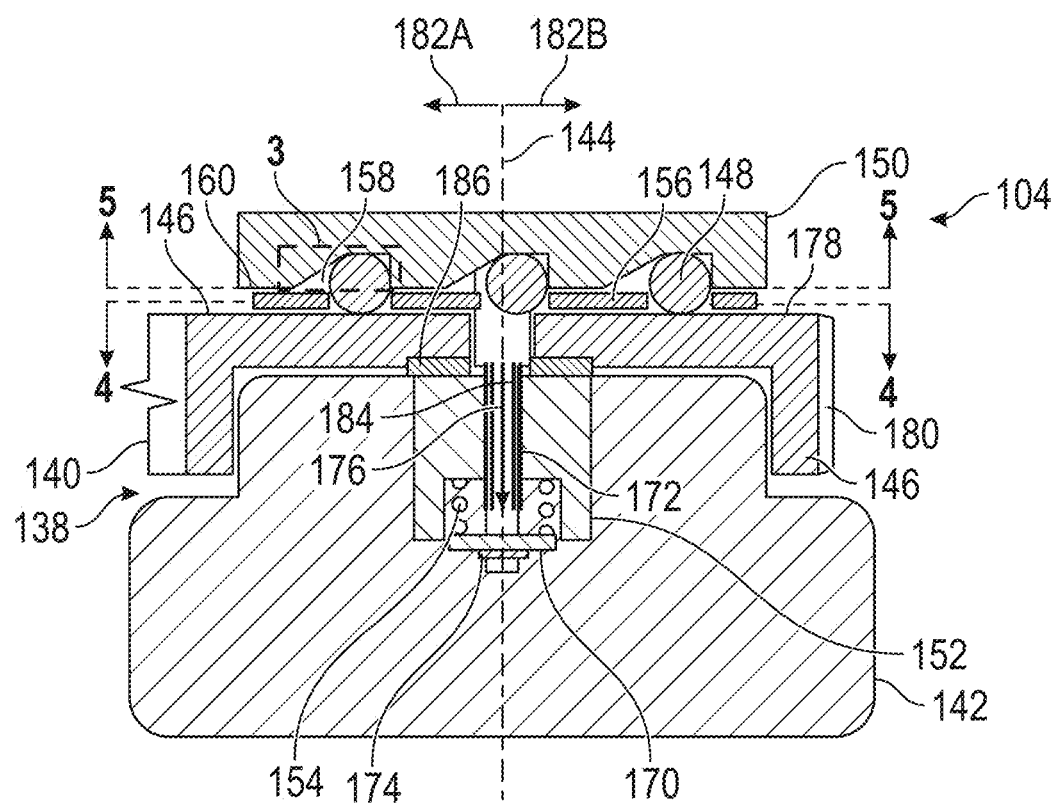
FIG. 2 is a schematic section view of the torque limiting device of FIG. 1 in an engaged state.

The spring member 154 produces a spring force 176 generally along the longitudinal axis 144. The pinion gear 152 is fixed in position on the longitudinal axis 144 by the second gearing 142. As such, the spring force 176 of the spring member 154 is produced in a direction away from the drive plate 150. In FIG. 2, the spring force 176 compresses the force transmitting members 148 between the sun gear 146 and the drive plate 150 to hold the force transmitting members 148 in stationary contact with both the pocket surfaces 162 and a sun gear end face 178.

Furthermore, the sun gear 146 has teeth 180 that are engaged with corresponding teeth (not shown) of the first gearing 140 such that the motor torque from the motor 136 is transmitted through the first gearing 140 to rotationally drive the sun gear 146. When rotationally driven, the sun gear 146 selectively rotates about the longitudinal axis 144 in first and second directions 182A and 182B, respectively. As illustrated, rotation of the sun gear 146 in the first direction 182A applies the EPB 102 and rotation of the sun gear 146 in the second direction 182B releases the EPB 102.

The pinion gear 152 is fixed by splines 184 to the shaft 172. As such, the drive plate 150 and the pinion gear 152, through the shaft 172, selectively rotate together about the longitudinal axis 144 in the first and second directions 182A and 182B, respectively. The pinion gear 152 also has teeth that are engaged with the second gearing 142 such that the motor torque may be selectively transmitted through the torque limiting device 104 to the second gearing 142.

The sun gear 146 is supported on the pinion gear 152 by a bearing 186. The bearing 186 supports the sun gear 146 on the pinion gear 152 while also allowing independent rotation of the sun gear 146 and the pinion gear 152. Preferably, the bearing 186 is fabricated from a low friction material. As a non-limiting example, the bearing 186 may be a washer. As a further example, the bearing 186 may be fabricated from a plastic material.

With reference to FIGS. 1-8, operation of the torque limiting devices 104 will now be discussed. The following discussion of operation of one of the torque limiting devices 104 applies to all of the torque limiting devices 104 provided for the EPB 102.

in FIG. 2, the torque limiting device 104 is in an engaged state during application of the EPB 102. The engaged state for the torque limiting device 104 occurs while the spindle 128 associated with the torque limiting device 104 is being driven to take up the clearance between the associated conical outer portion 132 and conical inner portion 134.

At the start of application of the EPB 102, the sun gear 146 receives the motor torque from the first gearing 140 and is rotated in the first direction 182A. As the sun gear 146 rotates in the first direction 182A, the spring force 176 holds the force transmitting members 148 compressed between the sun gear 146 and the drive plate 150. This prevents the force transmitting members 148 from rolling or otherwise moving in a manner that would not transmit the motor torque between the sun gear 146 and the drive plate 150. By not rolling, the force transmitting members 148 instead translate in the first direction 182A with the sun gear 146 and transmit the motor torque to the drive plate 150. As such, the drive plate 150 rotates in the first direction 182A with the sun gear 146 and transmits the motor torque to the pinion gear 152 and second gearing 142.

Figure 7:
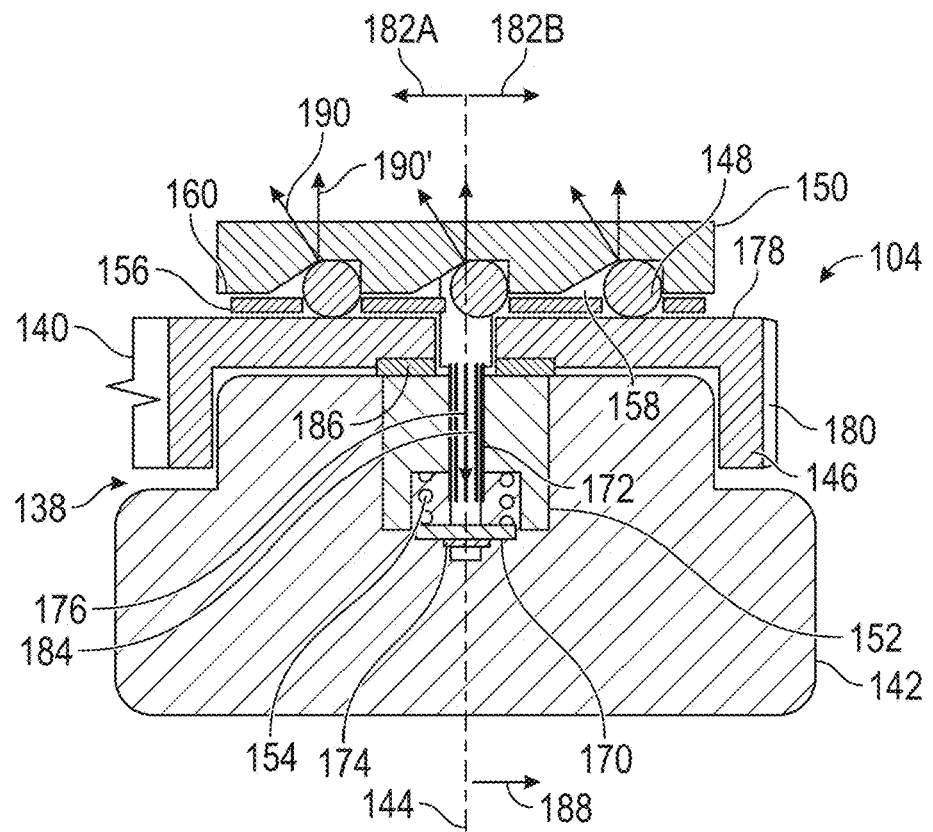
FIG. 7 is a first schematic section view of the torque limiting device of FIG. 1 in an engaged state.
Figure 8:
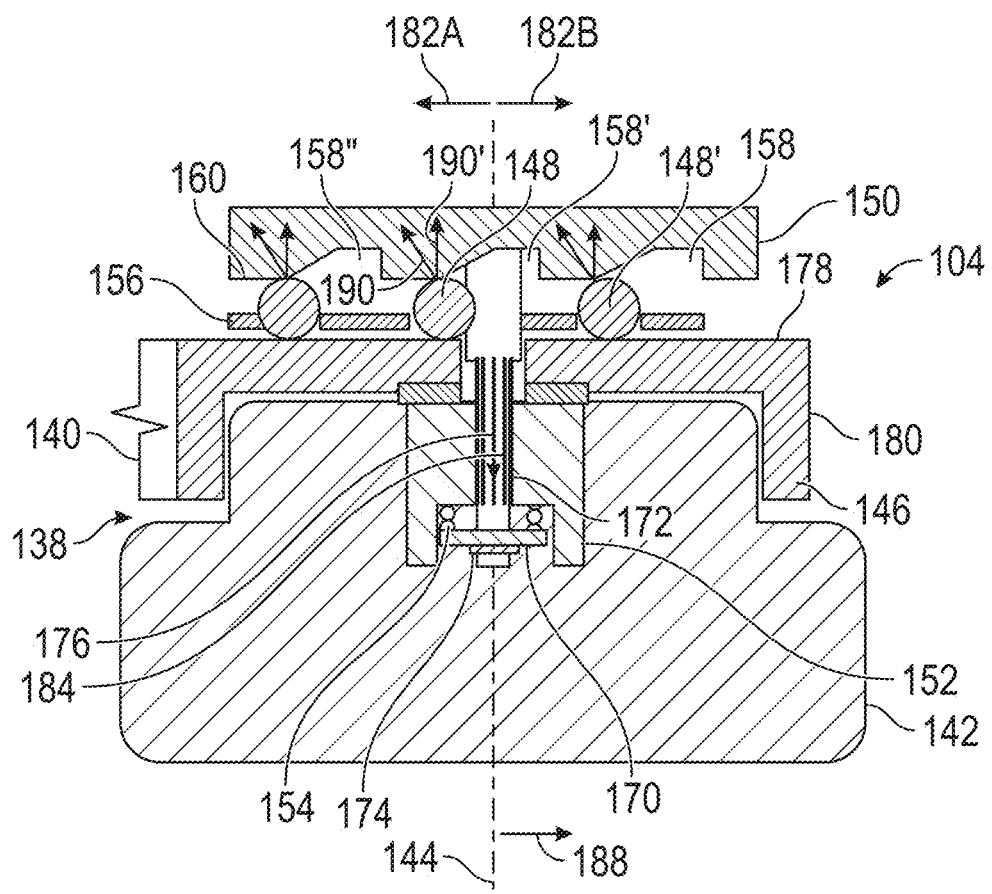
FIG. 8 is a second schematic section view of the torque limiting device of FIG. 1 in the disengaged state.

In FIGS. 7 and 8, the torque limiting device 104 is in a disengaged state during application of the EPB 102. The disengaged state for the torque limiting device 104 occurs when the conical outer portion 132 is clamped to the conical inner portion 134 for the corresponding torque limiting device 104 and the motor 136 is still producing the motor torque. The conical outer portion 132 being clamped to the conical inner portion 134 produces a clamp force 188 that holds the conical outer portion 132, spindle 128, second gearing 142, pinion gear 152, and drive plate 150 stationary while the sun gear 146 continues rotating in the first direction 182A. Specifically, the clamp force 188 results from engagement of the conical outer portion 132 against the conical inner portion 134. The clamp force 188 acts in the second direction 182B, which is opposite the first direction 182A in which the motor torque is acting, and slows or otherwise resists rotation of the drive plate 150 in the first direction 182A. In the disengaged state, the drive plate 150 is held stationary by the clamp force 188 while the motor torque continues to rotate the sun gear 146 in the first direction 182A.

Referring specifically to FIG. 7, the drive plate 150 has started to be held stationary by the clamp force 188 while the motor torque continues to rotate the sun gear 146 in the first direction 182A. This results in the force transmitting members 148 applying reactionary forces 190 to the ramp surfaces 164. The reactionary forces 190 act normally to where the force transmitting members 148 contact the ramp surfaces 164. As such, the reactionary forces 190 have longitudinal components 190' that act parallel to the longitudinal axis. These longitudinal components 190' act opposite the spring force 176.

As the conical outer portion 132 further tightens against the conical inner portion 134, the clamp force 188 increases. As the clamp force 188 increases, and the motor torque rotating the sun gear 146 in the first direction 182A remains constant or increases, the reactionary forces 190 and longitudinal components 190' also increase. At some point in time, a sum of the longitudinal components 190' will exceed or otherwise overcome, counteract, or offset the spring force 176. When the sum of the longitudinal components 190' exceeds the spring force 176, the clamp force 188 has overcome the spring force 176, the spring member 154 compresses, and the drive plate 150 displaces along the longitudinal axis 144 and away from the sun gear 146.

As the drive plate 150 displaces away from the sun gear 146, a clearance between the drive plate 150 and the sun gear 146 increases. This increased clearance between the drive plate 150 and the sun gear 146 allows the rotation of the sun gear 146 in the first direction 182A to roll or otherwise move the force transmitting members 148 up the ramp surfaces 164 from the pocket surfaces 162 to the drive plate end face 160. As the clamp force 188 continues to increase, and the longitudinal components 190' also continue to increase, the drive plate 150 continues to move away from the sun gear 146 until the sun gear 146 is rolling the force transmitting members 148 on the drive plate end face 160.

Referring specifically to FIG. 8, the force transmitting members 148 are rolling on the drive plate end face 160 and the sun gear 146 continues to rotate in the first direction 182A while the drive plate 150 is held stationary. As a result, the force transmitting members 148 roll on the drive plate end face 160 until falling back into or otherwise reentering the pockets 158. Each of the force transmitting members 148 falls back into the pocket 158 that is sequentially after the pocket 158 the force transmitting member 148 had immediately before exited by rolling up the ramp surface 164 i.e., the force transmitting members 148 reenter the next pockets 158 that the force transmitting members 148 are rolling towards.

This pattern of exiting and reentering the pockets 158 continues as long as the sun gear 146 is rotating in the first direction 182A and the drive plate 150 is held stationary by the clamp force 188. For example, a force transmitting member 148' will roll on the drive plate end face 160 in the first direction 182A until falling into a first pocket 158'. The force transmitting member 148' will then roll up the ramp surface 164 of the first pocket 158', roll across the drive plate end face 160 between the first pocket 158' and a second pocket 158", and then fall into the second pocket 158".

The torque limiting device 104 in the disengaged state does not fully receive the motor torque. Instead, the motor torque that exceeds the clamp force 188 is directed through any other of the torque limiting devices 104 that are still in the engaged state to continue actuating the EPB 102. Torque equal to the clamp force 188 continues to be transmitted through the first gearing 140 to the now disengaged torque limiting device 104 to maintain the torque limiting device 104 in the disengaged state. When all of the torque limiting devices 104 are disengaged, the EPB 102 is considered fully applied and the motor 136 stopped.

As a non-limiting example, for first and second torque limiting devices 104, the first and second torque limiting devices 104 both start in the engaged state and transmit the motor torque to corresponding spindles 128. The first torque limiting device 104 fully transmits a first portion of the motor torque to the first spindle 128 and the second torque limiting device 104 fully transmits a second portion of the motor torque to the second spindle 128. Typically, the first and second portions of the motor torque are equal although such is not necessary.

Then, when the conical outer portion 132 of the spindle nut 126 on the spindle 128 corresponding to the first torque limiting device 104 is clamped, the first torque limiting device 104 becomes disengaged (while the second torque limiting device 104 remains engaged). The first portion of the motor torque that exceeds the clamp force 188 for the first torque limiting device 104 is transmitted to the second torque limiting device 104—i.e., when the first torque limiting device 104 is disengaged, the second torque limiting device 104 receives a summation of the full second portion of the motor torque and an amount of the first portion of the motor torque that exceeds the clamp force 188 for the first torque limiting device 104.

When the conical outer portion 132 of the spindle nut 126 on the spindle 128 corresponding to the second torque limiting device 104 is also clamped, the second torque limiting device 104 also becomes disengaged (such that both the first and second torque limiting devices 104 are disengaged). At this point, the EPB 102 is applied and the motor 136 turned off. As used herein with reference to operation of the torque limiting devices 104, the terms "first" and "second" are non-temporal. Either of the first or second torque limiting devices 104 may disengage first.

When the EPB 102 is released following application of the EPB 102, the torque limiting devices are expected to be in the disengaged state. To release the EPB 102, the motor torque rotates the sun gear 146 in the second direction 182B. During release of the EPB 102, the clamp force 188 and reactionary forces 190 are reduced to zero. The sun gear 146 rolls the force transmitting members 148 on the drive plate end face 160 in the second direction 182B towards the pockets 158. The force transmitting members 148 reenter the pockets 158 by rolling or otherwise moving down the ramp surfaces 164 from the drive plate end face 160 to the pocket surfaces 162.

As the force transmitting members 148 roll down the ramp surface 164 without the reactionary forces 190, the spring member 154 decompresses to the position shown in FIG. 2. As the spring member 154 returns to the position shown in FIG. 2, the clearance between the sun gear 146 and drive plate 150 is reduced until the force transmitting members 148 are again held compressed by the spring force 176 between the sun gear 146 and the dive plate 150. With the force transmitting members 148 held compressed between the sun gear 146 and the drive plate 150, the motor torque is again transmitted from the sun gear 146 to the drive plate 150 such that the drive plate is rotated in the second direction 182B.

During release of the EPB 102, while the sun gear 146 and the drive plate 150 are rotating in the second direction 182B, the stop surfaces 166 keep the force transmitting members 148 in the pockets 158. The drive plate 150 is free to rotate in the second direction 182B regardless of whether the conical outer portion 132 is in contact with the conical inner portion 134—i.e., the drive plate 150 is free to rotate in the second direction 182B regardless of whether the brake piston 122 is clamped or unclamped. With the drive plate 150 free to rotate in the second direction 182B, the reactionary forces 190 do not develop. Furthermore, the stop surface 166 maintains the force transmitting members 148 in the pockets 158 by preventing the force transmitting members 148 from rolling or otherwise moving out of the pockets in the second direction 182B. During release of the EPB 102, the force transmitting members 148 are not rolling against any surfaces sufficiently transverse to the longitudinal axis 144 to develop the reactionary forces 190 because the stop surfaces 166 are significantly parallel to the longitudinal axis 144.

The profile of the ramp surfaces 164 and/or a stiffness of the spring member 154 may be tuned or otherwise adjusted to set a threshold value of the clamp force 188 at which each of the torque limiting devices 104 becomes disengaged. Alternatively, the threshold value may more simply be defined as the clamp force 188 that produces the longitudinal components 190' of the reactionary forces 190 that compress the spring member 154 and disengages the torque limiting devices 104. As a first non-limiting example, as a slope of the ramp surfaces 164 from the pocket surface 162 increases, the clamp force 188 at which the torque limiting devices 104 become disengaged also increases. As a second non-limiting example, as the stiffness of the spring member 154 is increased, the clamp force 188 at which the torque limiting devices 104 become disengaged also increases. The threshold value may be the same for all of the torque limiting devices 104 or may be different for one or more of the torque limiting devices 104.

Figure 9A:
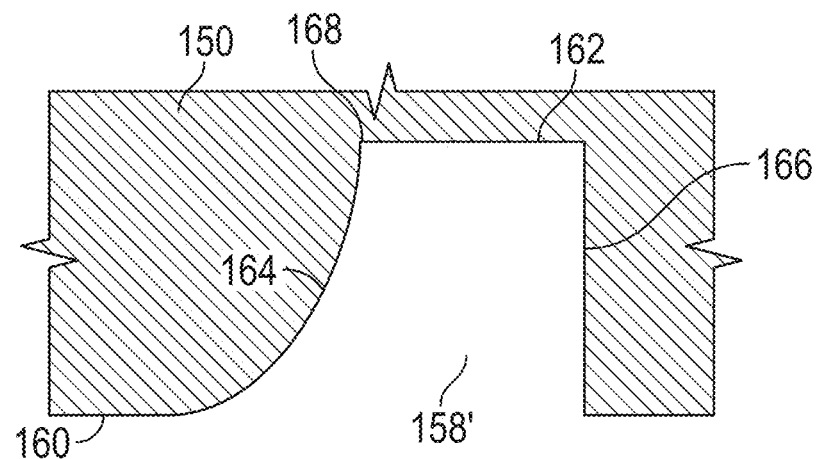
FIGS. 9A and 9B are section views of alternate ramp surfaces for the torque limiting device of FIG. 1.
Figure 9B:
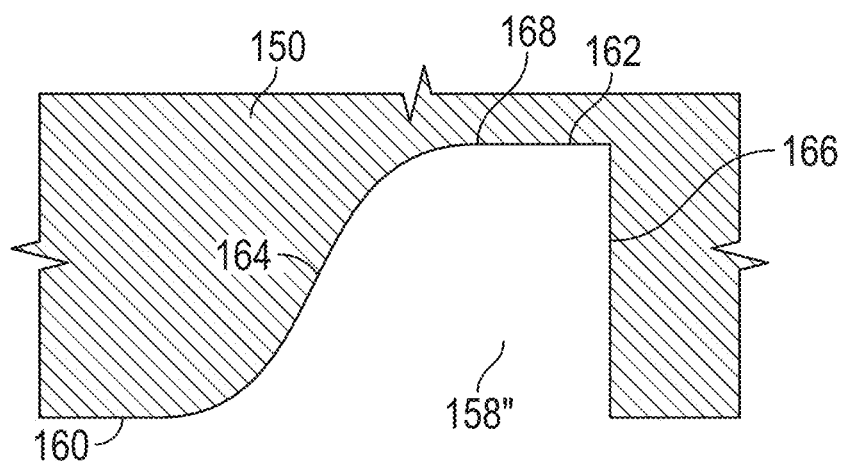

Referring now to FIGS. 9A and 9B, there are illustrated alternate ramp surfaces 164' and 164" for the pockets 158. In FIG. 9A, the ramp surface 164' has a convex curved surface. In FIG. 913, the ramp surface 164" has a non-linear surface with a varying radius.

Figure 10:
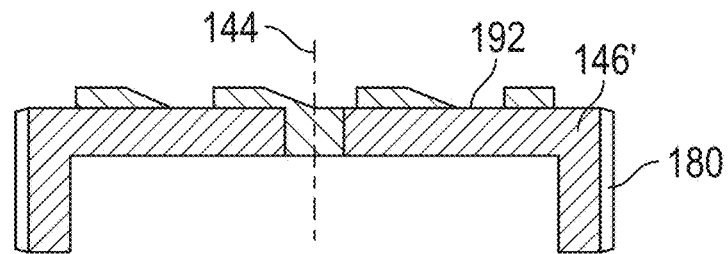
FIG. 10 is a schematic section view of an alternate sun gear for the torque limiting device of FIG. 1.

Referring now to FIG. 10, there is illustrated an alternate sun gear 146' having second pockets 192. The second pockets 192 in the alternate sun gear 146' are similar to the pockets 158 in the drive plate 150. Specifically, the second pockets 192 are symmetric across the force transmitting members 148 to the pockets 158 in the drive plate 150. The sun gear 146 having the second pockets 192 in conjunction with the pockets 158 in the drive plate 150 increases a torque capacity of the torque limiting device 104.

Figure 11:
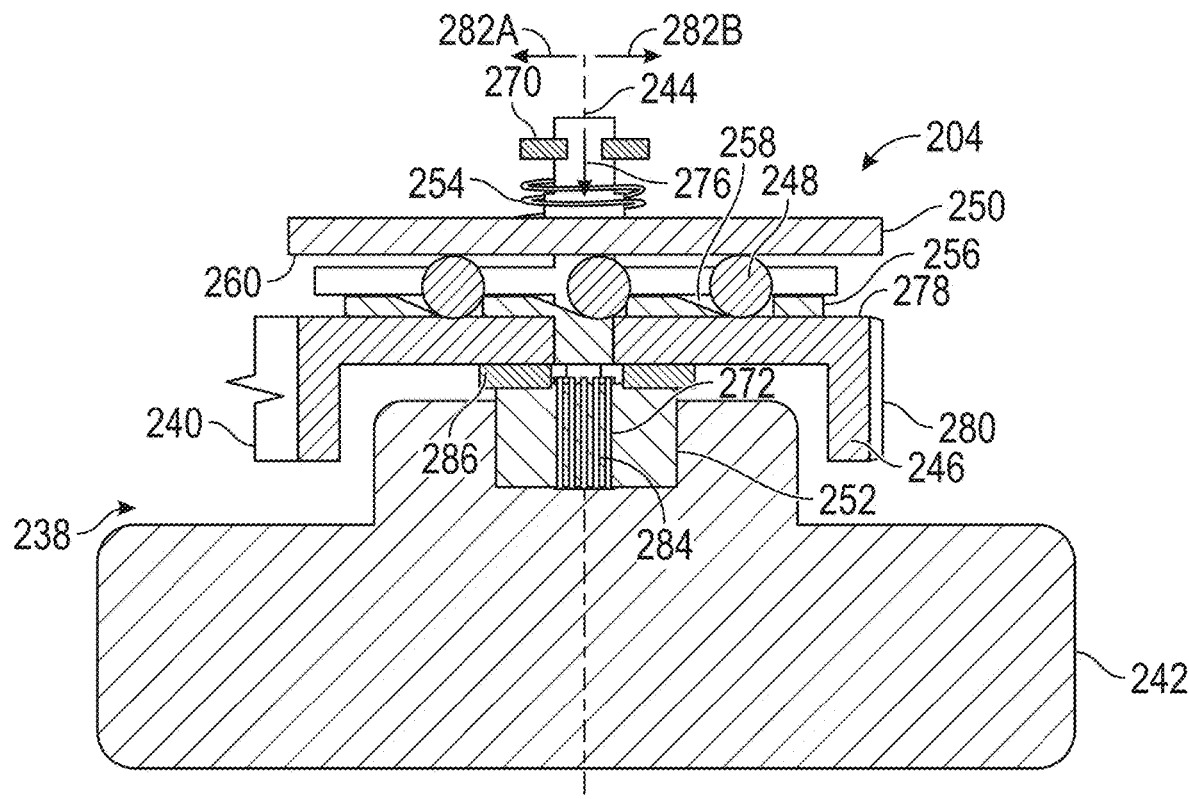
FIG. 11 is a schematic section view of a second embodiment of a torque limiting device in accordance with the present invention.

Referring now to FIG. 11, there is illustrated a toque limiting device, indicated generally at 204, in accordance with a second embodiment of the present invention. The torque limiting device 204 is a variation of the torque limiting device 104 described with reference to FIGS. 1-10. As such, like reference numerals, increased by 100, designate corresponding parts in the drawings and detailed description thereof will be omitted.

The torque limiting device 204 has a retention member 270 at an end of a shaft 272 that is opposite a pinion gear 252. Between the retention member 270 and a drive plate 250 is a spring member 254. Pockets 258 are located in a sun gear 246.

Figure 12:
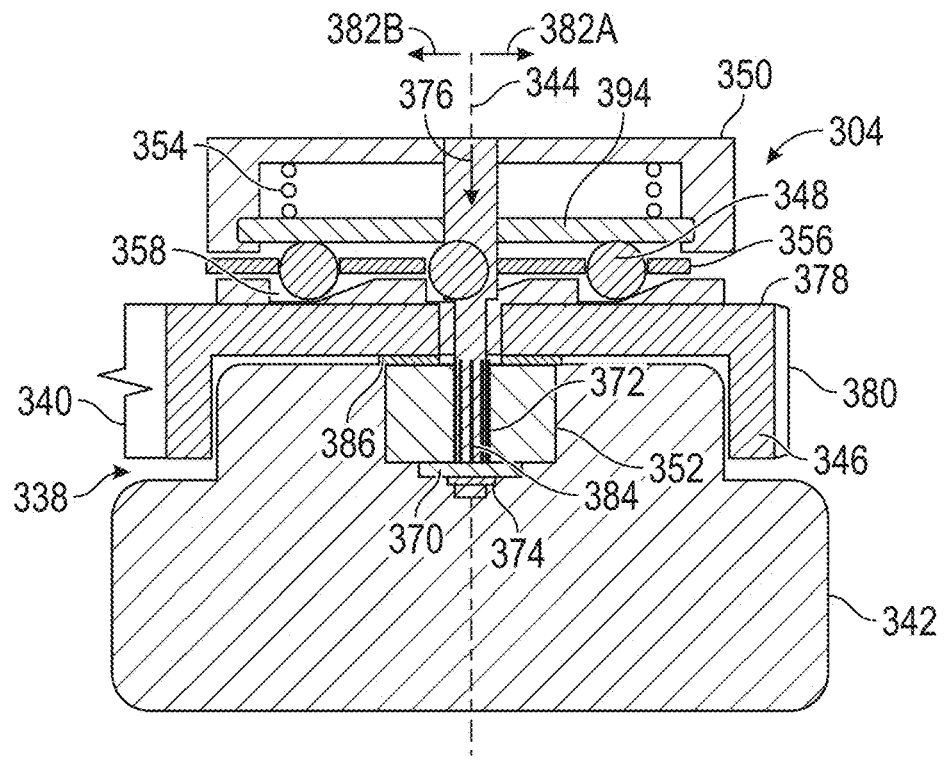
FIG. 12 is a schematic section view of a third embodiment of a torque limiting device in accordance with the present invention.

Referring now to FIG. 12, there is illustrated a toque limiting device, indicated generally at 304, in accordance with a third embodiment of the present invention. The torque limiting device 304 is a variation of the torque limiting device 104 described with reference to FIGS. 1-10. As such, like reference numerals, increased by 200, designate corresponding parts in the drawings and detailed description thereof will be omitted.

The torque limiting device 304 has a spring member 354 held between a drive plate 350 and a reaction plate 394. The reaction plate 394 applies a spring force 376 produced by the spring member 354 to force transmitting members 348.

Figure 13:
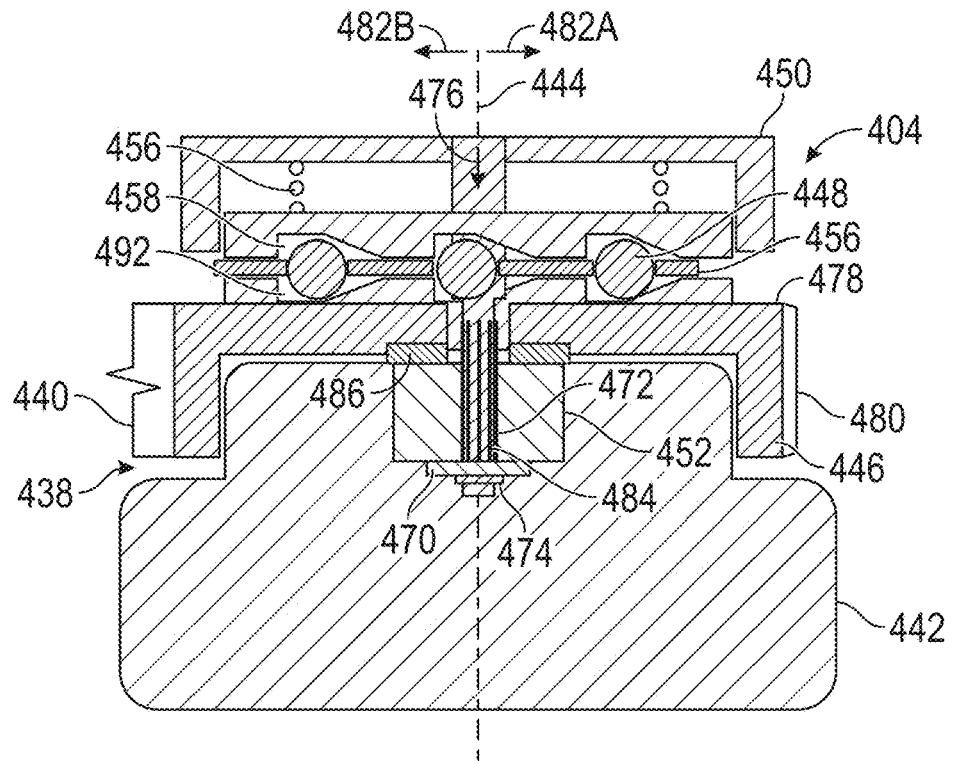
FIG. 13 is schematic section view of a fourth embodiment of a torque limiting device in accordance with the present invention.

Referring now to FIG. 13, there is illustrated a toque limiting device, indicated generally at 404, in accordance with a fourth embodiment of the present invention. The torque limiting device 404 is a variation of the torque limiting device 104 described with reference to FIGS. 1-10. As such, like reference numerals, increased by 300, designate corresponding parts in the drawings and detailed description thereof will be omitted.

The torque limiting device 404 has a spring member 454 held between a drive plate 450 and a reaction plate 494. The reaction plate 494 applies a spring force 476 produced by the spring member 454 to force transmitting members 448. First pockets 458 are located in the reaction plate 494 and second pockets 492 are located in a sun gear 446.

Figure 14:
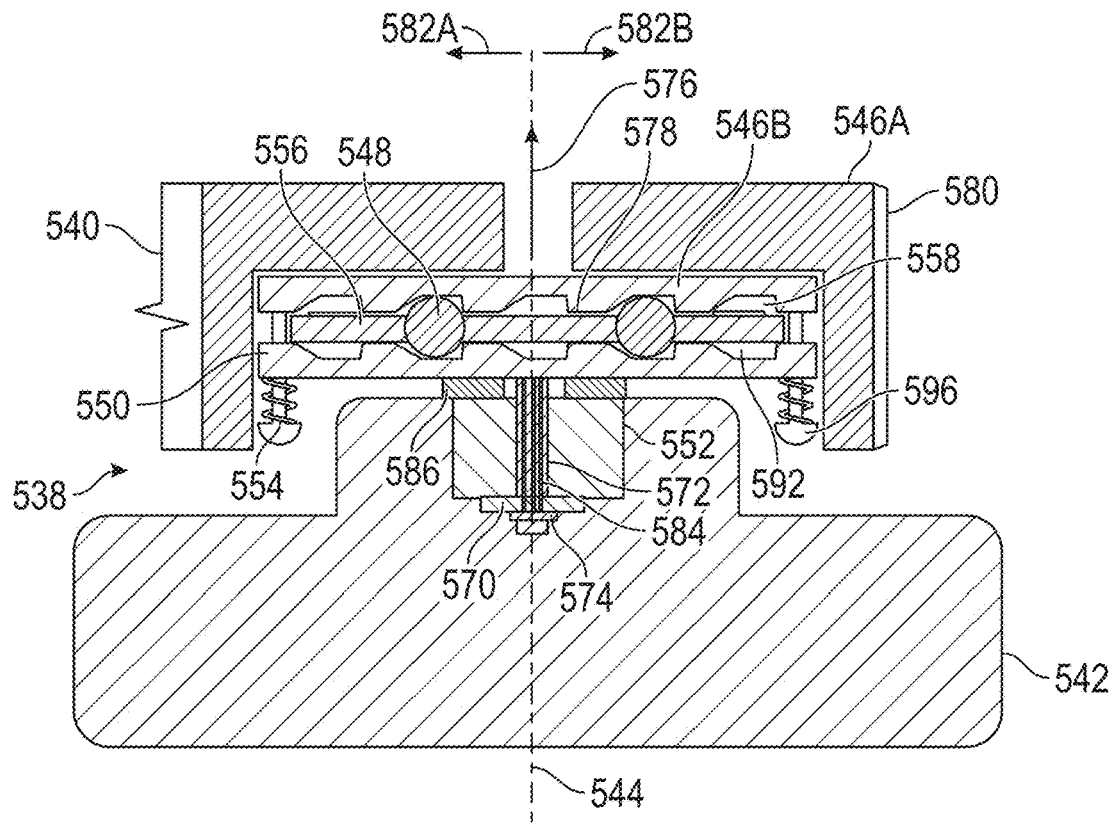
FIG. 14 is a schematic section view of a fifth embodiment of a torque limiting device in accordance with the present invention.

Referring now to FIG. 14, there is illustrated a toque limiting device, indicated generally at 504, in accordance with a fifth embodiment of the present invention. The torque limiting device 504 is a variation of the torque limiting device 104 described with reference to FIGS. 1-10. As such, like reference numerals, increased by 400, designate corresponding parts in the drawings and detailed description thereof will be omitted.

The torque limiting device 504 has a sun gear comprising first and second sun gear portions 546A and 546B, respectively. There are pins 596 extending between the sun gear second portion 546B and the drive plate 550. Spring members 554 are positioned on the pins 596. First pockets 558 are defined in the sun gear second portion 546B and second pockets 592 are defined in the drive plate 550.

Figure 15:
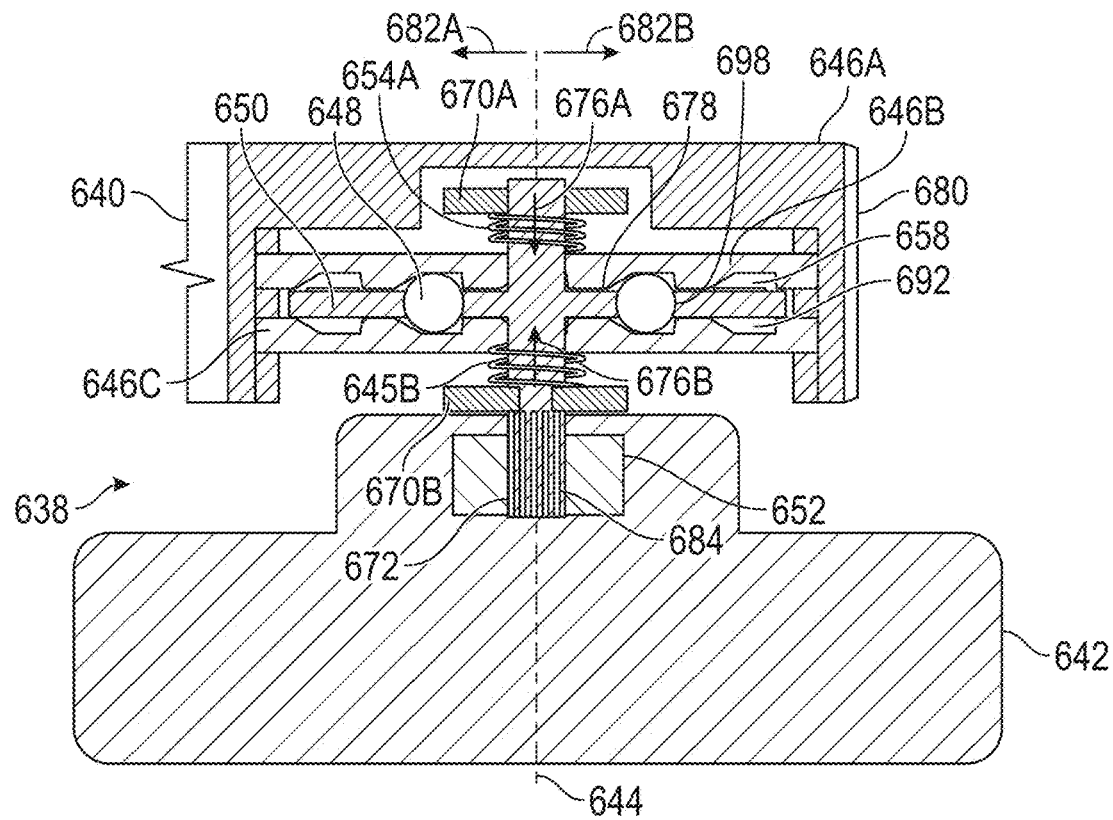
FIG. 15 is a schematic section view of a sixth embodiment of a torque limiting device in accordance with the present invention.
Figure 16:
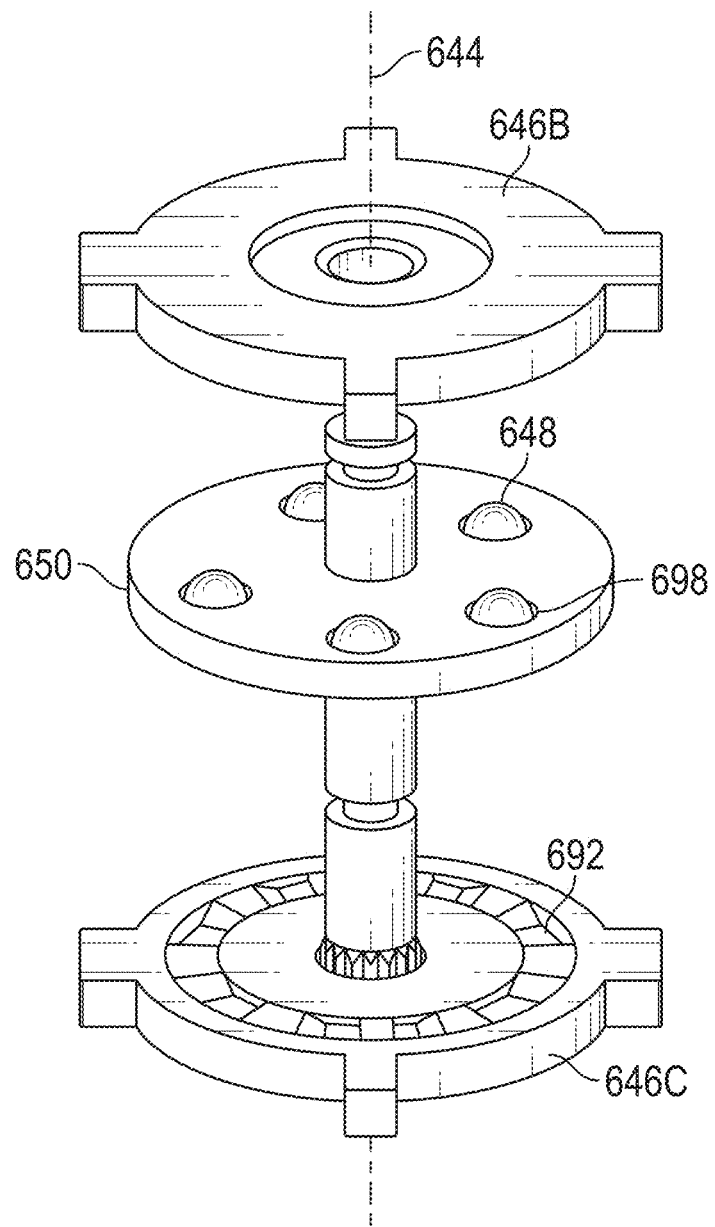
FIG. 16 is a partial exploded perspective view of the torque limiting device of FIG. 15.

Referring now to FIGS. 15 and 16, there is illustrated a toque limiting device, indicated generally at 604, in accordance with a sixth embodiment of the present invention. The torque limiting device 604 is a variation of the torque limiting device 104 described with reference to FIGS. 1-10. As such, like reference numerals, increased by 500, designate corresponding parts in the drawings and detailed description thereof will be omitted.

The torque limiting device 604 has a sun gear comprising first, second, and third sun gear portions 646A, 646B, and 646C, respectively. The second and third sun gear portions 646B and 646C, respectively, are fixed to rotate with the sun gear first portion 646A. Force transmitting members 648 are held in position by through openings 698 in a drive plate 650. First pockets 658 are defined in the sun gear second portion 646B and second pockets 692 are defined in the sun gear third portion 646C.

The torque limiting device 604 further has first and second spring members 654A and 654B, respectively. First and second retention members 670A and 670B, respectively, retain the first and second spring members 654A and 654B, respectively. The first spring member 654A produces a first spring force 676A and the second spring member 654B produces a second spring force 676B. The first and second spring forces 676A and 676B, respectively, act together to compress force transmitting members 648 between the sun gear first and second portions 646B and 646C, respectively, and the drive plate 650. To those skilled in the art, the arrangement of the torque limiting 604 may be known as a cartridge clutch.

In accordance with the provisions of the patent statutes, the principle and mode of operation of this invention have been described and illustrated in its preferred embodiments. However, it must be understood that this invention may be practiced otherwise than as specifically explained and illustrated without departing from its spirit or scope.

What is claimed is:

1. A vehicle disc brake assembly having a hydraulically actuated service brake and an electrically actuated parking brake, wherein the vehicle disc brake assembly comprises:
   a brake disc;
   a first brake piston having a first inner portion;
   a first spindle nut rotationally restrained in the first brake piston and having a first outer portion, wherein the first outer portion is configured to clamp against the first inner portion to produce a first clamp force when the first spindle is rotated and the first clamp force engages the first brake piston against the brake disc;
   a second brake piston having a second inner portion;
   a second spindle nut rotationally restrained in the second brake piston and having a second outer portion, wherein the second outer portion is configured to clamp against the second inner portion to produce a second clamp force when the second spindle is rotated and the second clamp force engages the second brake piston against the brake disc;
   an electric motor configured to produce a torque to actuate and apply the parking brake;
   a first torque limiting device configured to, during an application of the parking brake, fully transmit a first portion of the torque to the first spindle when a first threshold value exceeds the first clamp force and not fully transmit the first portion of the torque to the first spindle when the first clamp force exceeds the first threshold value; and
   a second torque limiting device configured to, during the application of the parking brake, fully transmit a second portion of the torque to the second spindle when a second threshold value exceeds the second clamp force and not fully transmit the second portion of the torque to the second spindle when the second clamp force exceeds the second threshold value, wherein each of the first and second torque limiting devices comprises:
   a first gear;
   a drive plate;
   a shaft extending from the drive plate through the first gear and being rotatable with the respective spindle;
   pockets in an end face of at least one of the first gear and the drive plate;
   force transmitting members; and
   a spring member producing a spring force on the drive plate, wherein, during the application of the parking brake, the spring force
      holds the force transmitting members compressed in the pockets to transmit a force between the first gear and the drive plate when the spring force exceeds a portion of a clamp force and
      does not hold the force transmitting members in the pockets, and the force is not transmitted between the first gear and the drive plate, when the portion of the clamp force exceeds the spring force;
   wherein for each of the first and second torque limiting devices the shaft is rotatably connected to the respective spindle and moves axially relative to the spindle in response to the spring force.

2. The vehicle disc brake assembly of claim 1 wherein the first and second threshold values are equal.

3. The vehicle disc brake assembly of claim 1 wherein, when the first clamp force exceeds the first threshold value and the second threshold value exceeds the second clamp force, the second torque limiting device transmits the first portion of the torque that exceeds the first threshold to the second spindle.

4. The vehicle disc brake assembly of claim 1 wherein the electric motor is a single electric motor.

5. The vehicle disc brake assembly of claim 1 wherein a first total quantity of torque limiting devices is equal to a second total quantity of brake pistons.

6. The vehicle disc brake assembly of claim 1 wherein, during a release of the parking brake, the first torque limiting device fully transmits the first portion of the torque to the first spindle and the second torque limiting device fully transmits the second portion of the torque to the second spindle.

7. The vehicle disc brake assembly of claim 1 wherein,
for the first torque limiting device, the first gear is configured to receive the first portion of the torque, the drive plate is configured to transmit the first portion of the torque to the first spindle, and the spring force holds the force transmitting members compressed in the pockets when the spring force exceeds a portion of the first clamp force and
for the second torque limiting device, the first gear is configured to receive the second portion of the torque, the drive plate is configured to transmit the second portion of the torque to the second spindle, and the spring force holds the force transmitting members compressed in the pockets when the spring force exceeds a portion of the second clamp force.

8. The vehicle disc brake assembly of claim 1 wherein the first threshold value is equal to the spring force of the first torque limiting device and the second threshold value is equal to the spring force of the second torque limiting device.

9. The vehicle disc brake assembly of claim 1 wherein the force transmitted by the first torque limiting device is the first portion of the torque and the force transmitted by the second torque limiting device is the second portion of the torque.

10. The vehicle disc brake assembly of claim 1 wherein for each of the first and second torque limiting devices the shaft and the drive plate are axially movable together in response to the spring force.

11. The vehicle disc brake assembly of claim 1 wherein for each of the first and second torque limiting devices the shaft is coextensive with a rotational axis of the respective spindle.

12. An electrically actuated parking brake for a vehicle disc brake assembly having first and second brake pistons and a brake disc, the parking brake comprising:

a single electric motor configured to produce a torque to actuate and apply the parking brake;

a first torque limiting device configured to, during an application of the parking brake, fully transmit a first portion of the torque to a first spindle until a first clamp force produced by the parking brake overcomes a first spring force of the first torque limiting device, wherein the first clamp force is configured to engage the first brake piston against the brake disc; and a second torque limiting device configured to, during the application of the parking brake, fully transmit a second portion of the torque to a second spindle until a second clamp force produced by the parking brake overcomes a second spring force of the second torque limiting device, wherein the second clamp force is configured to engage the second brake piston against the brake disc and, when the first clamp force overcomes the first spring force and the second spring force overcomes the second clamp force, the first torque limiting device does not fully transmit the first portion of the torque to the first spindle and the first portion of the torque that exceeds the first spring force is instead transmitted to the second spindle by the second torque limiting device, wherein each of the first and second torque limiting devices comprises:

a first gear;

a drive plate;

a shaft extending from the drive plate through the first gear and being rotatable with the respective spindle;

pockets in an end face of at least one of the first gear and the drive plate;

force transmitting members; and a spring member producing a spring force on the drive plate, wherein, during the application of the parking brake, the spring force
holds the force transmitting members compressed in the pockets to transmit a force between the first gear and the drive plate when the spring force exceeds a portion of a clamp force and
does not hold the force transmitting members in the pockets, and the force is not transmitted between the first gear and the drive plate, when the portion of the clamp force exceeds the spring force, wherein for each of the first and second torque limiting devices the shaft is rotatably connected to the respective spindle and moves axially relative to the spindle in response to the spring force.

13. The parking brake of claim 12 wherein, during a release of the parking brake, the first torque limiting device fully transmits the first portion of the torque to the first spindle and the second torque limiting device fully transmits the second portion of the torque to the second spindle.

* * * * *